Patented Nov. 10, 1953

2,658,836

UNITED STATES PATENT OFFICE 2,658,836

PRESERVING PLANT AND ANIMAL TISSUES

George R. Fessenden, Baltimore, Md.

No Drawing. Application September 14, 1951,
Serial No. 246,719

11 Claims. (Cl. 117—3)

This application is a continuation-in-part of my copending application Serial No. 736,105, filed March 20, 1947, now Patent No. 2,567,929, and my copending applications Serial No. 69,840, filed January 7, 1949, now Patent No. 2,606,843, and Serial No. 219,121, filed April 3, 1951, and relates to a method for preserving biological material, both plant and animal, in a manner that provides for enduring retention of the natural appearance, including color and shape, in material which has generally unstable or impermanent appearance characteristics.

Material so preserved is of particular value as museum specimens and is widely useful for educational purposes in the natural sciences and elsewhere. Furthermore, it has unique value for decorative and ornamental use, for product demonstration, display use, and for various other self evident purposes.

The practices heretofore commonly employed for preserving biological material, such as flowers and other plant parts, and zoological specimens, for the purposes enumerated above have given no special attention to the paramount consideration of insuring permanence in the natural appearance of the preserved material in a manner true to the original living specimens, particularly where the color is unstable during processing or subsequently thereto. That is to say, prior practices in preparing and preserving most biological material yield products that only partially fulfill the desired requirements, in that the natural color is not rendered permanent, or it is undesirably altered, or it is replaced by artificial coloring matter, and the preserved material is not adequately protected against deterioration with respect to its appearance.

Accordingly, with a view to avoiding the objections above recited, and solving the various problems incident to the previous shortcomings of the art, a primary object of the present invention is to employ new procedures for preserving biological material, which is commonly subject to change in appearance, in a manner to retain enduringly its natural appearance, including color and shape, and for providing such preserved material with durable and effective protection against deterioration and damage without undesirably altering its natural appearance in so doing.

The foregoing primary object, namely, to prepare biological material so that its natural appearance, including color and shape, is enduringly preserved, may be carried out in several ways, for example: (1) stabilizing the color by chemical treatment and fixing the shape by dehydration, and then protecting the color-stabilized material by impregnating it with a moisture-resistant shape-reinforcing substance; (2) stabilizing the color by dehydration, impregnating the material thus prepared with a moisture-resistant shape-reinforcing substance which provides a surface to which a subsequent coating will adhere, and then protecting the impregnated material with a relatively thin transparent or translucent moisture-excluding durable coating or armor securely bonded to the prepared surface; (3) stabilizing the color by chemical treatment and fixing the shape by dehydration, impregnating and/or coating the material thus prepared with a shape-reinforcing substance which is impervious to and/or unaffected by a subsequently applied enveloping medium and which prevents alteration of the natural appearance of the material by such medium, and then protecting the impregnated and/or coated material by surrounding it with a relatively thick mass of transparent moisture-excluding durable plastic; (4) stabilizing the color by chemical treatment and fixing the shape by dehydration, impregnating the material thus prepared with a substance which aids in maintaining its natural appearance, and then protecting the impregnated material by enveloping it in a durable moisture-resistant substantially transparent resinous medium which may be a relatively thin adherent coating, a relatively thick massive coating, or a hollow air-tight case; (5) stabilizing the color by chemical treatment and fixing the shape by dehydration and then enveloping the preserved and dehydrated material in a protective medium as set forth in (3); (6) fixing the shape by dehydration either in air or in a relatively inert liquid medium, then stabilizing the color by chemical treatment, impregnating the preserved dehydrated material with a substance which aids in maintaining its natural appearance, and enveloping the material thus prepared in a moisture-resistant substantially colorless resinous coating.

In the preparation of this preserved material, it has been found that biological objects vary to such an extent that different procedures are necessary for preparing the diverse classes of material so that the natural appearance, including color and shape, is not altered through processing and is enduringly retained thereafter under conditions of ordinary use.

Therefore, biological material may, from the point of view of processing, be classified, for convenience, with respect to retention of appearance characteristics, as follows:

Class A comprises material in which the color is naturally unstable and is irreversibly altered by air-drying. This class has been found to include such material as the flowers and leaves of most orchid, gardenia, Indian-pipe, and mallow species; the flowers of many poppy, verbena, trumpet-creeper, and camellia species; the leaves of many mint, spurge, cactus, pelargonium and cinchona species; most of the fleshy fruits and the fleshy fungi; and zoological organisms in general with the exception of the groups noted in the remaining classes.

Class B comprises material in which the color is naturally unstable, but is not irreversibly altered by air-drying. This class has been found to include generally the diverse forms of plant material not specified in the other classes; and such zoological material as the green-pigmented locust, cricket and mantis species.

Class C comprises material in which the color does not require stabilization but the appearance is subject to alteration by the enveloping medium. This class has been found to include lichens, decayed wood, woody fungi, bark, feathers, and lepidopterous insects.

Class D comprises material in which color and shape are naturally stable and the appearance is not objectionably affected by the enveloping medium. This class comprises matured everlasting flowers such as the everlasting species of the amaranth and the composite families, matured grains and other grasses, cones, nuts and various dried fruits, and most woody or hardened parts of plants not noted in the foregoing class; and it further includes the durably pigmented insects which have rigid integuments, and such other zoological material as teeth, bones, carapaces, shells, horns and claws.

The present invention is primarily concerned with Classes A, B and C wherein the color of the material must be considered with respect to its stability during processing and subsequently thereto. Material in Class D may be utilized as desired in its natural state, or it may be dehydrated and enveloped in any well known manner without other preparation.

According to the present invention, the processing of biological material so as to preserve enduringly its natural appearance, consists generally of three stages, namely, Stage I—Stabilizing natural color and dehydrating; Stage II—Impregnating; Stage III—Enveloping. Stage I is carried out by procedures employed selectively in accordance with the characteristics of the material being processed, and Stages II and III are carried out by procedures employed selectively in accordance both with the nature of the material being processed and with the use to which the finished product is to be put.

Each of the foregoing stages comprises a number of new and improved steps and procedures which are employed selectively in accordance with the requirements of the classes of material to be processed, and which may be employed in the sequence given or otherwise, and separately or in combination with each other.

The terminology hereinafter used in describing the several actions, substances and materials is to be construed in the light of the following definitions: "material" is intended to mean biological material; "solution" is intended to include dispersions as well as true solutions; "dissolve" is intended to include the dispersion of substances in liquids as well as the forming of true solutions; the term "water-dissolving" as applied to another liquid is intended to mean that the liquid has the property of being able to hold in solution within itself an amount of water equal to at least 5% of the total weight of the solution; the noun "plastic" is intended to apply to resins and other water-resistant substances which are in a polymeric state or capable of being polymerized, and are plastic in that they are capable of being cast, molded, formed, or otherwise shaped by heat and/or pressure; "dehydration" is intended to mean removal of the water content to an extent sufficient to arrest chemical and physical changes which tend to occur when free moisture is present; "impregnation" is intended to mean saturating a permeable material with a substance, leaving a minimum thereof on the surface; the term "enveloping" is intended to mean selectively, coating, encasing, laminating or embedding; the term "conditioning agent" applies to substances employed for the purpose of modifying strength and rigidity characteristic and/or of preventing physical change in appearance factors during processing.

The stages generally described above will now be set forth in greater detail.

*Stage I.—Stabilizing natural color and dehydrating*

In the first stage in preparing biological material in which the natural appearance, including color and shape, are enduringly retained, the material, which may either be fresh, or previously dried, is subjected to a chemical preserving treatment which maintains, or reestablishes, the original color and stabilizes it against subsequent change. This chemical treatment consists in subjecting the material to a treating solution comprising a water-dissolving volatile organic liquid containing an oxidation inhibitor and a preserving substance which controls the hydrogen ion concentration and stabilizes the color and composition of the material. With these substances may be further employed selectively, a limited amount of water, a surface-active substance and a conditioning agent. The specific constituents of the solution and the amounts in which they are employed are dependent upon the nature of the particular material to be treated, their selection being determined experimentally in accordance therewith from the classes of substances hereinafter described, their amounts being confined within the limiting ranges specified.

In preserving plant and animal tissues so that their natural colors are stabilized and remain unchanged, I have found that the pH of the preserving solution must correspond substantially to that of the liquid medium of the tissues in which the natural coloring matter is suspended, and I have further found that different classes of coloring matter in various tissues subjected to preservation treatment have different pH requirements, and that these various pH requirements must be met by making proper adjustments in the pH of the preserving solution. In this connection I have determined, for example, that: (1) red colored tissues containing anthocyanin coloring matter require a solution pH ranging from 2.5 to 4.5, (1-A) magenta colored tissues require a pH within the range of 4.5 to 5.5, (1-B) purple colored tissue requirements are within the pH range of 5.5 to 6.5, and (1-C) blue colored tissue requirements are within the pH range of 6.5 to 7.5; (2) the pH requirements for optimum results with yellow, orange and red colored tissues containing carotenoid coloring matter are between the limits of 6.5 and 7.5, but values as low as 4.0 may be employed in certain cases to yield acceptable results; (3) for tissues containing chlorophyll and for those containing hemoglobin optimum pH values lie between 6.5 and 7.5; (4) for tissues containing flavonoid coloring matter optimum pH values range from 4.5 to 6.5, but acceptable results have been obtained with values ranging from 3.5 to 7.0; (5) tissues containing tannins and similar readily oxidizable color-producing substances generally require pH values within the range of 2.5 to 7.0.

For tissues containing certain classes of coloring matter set forth above, and also other classes not specifically referred to herein, which have pH requirements within the range of 5.5 to 6.5, I have found that their pH requirements may be adequately met by adjusting the preserving solution pH to a value within this range, and that such an adjustment can be obtained by adding thiourea to butyl alcohol which preferably contains approximately 2% of water. In the case of tissues containing classes of coloring matter requiring pH value requirements not included within this range, I have found that proper adjustment of the preserving solution pH can be obtained by adding to the above mentioned solution a non-oxidizing open chain carboxylic acid consisting of carbon, oxygen and hydrogen and preferably having a melting point above 35° C., and I have further found that a proper adjustment of the solution pH value may be obtained by adding to said solution an alkali metal or an alkaline earth metal salt of such an acid, and that said salts may be employed singly or in combination with each other or with said acids or with other substances.

I have further found in the case of certain naturally colored plant and animal tissues, notably those that are substantially free of readily oxidizable substances, that a preserving solution containing a non-oxidizing open chain carboxylic acid and/or an alkali metal salt thereof and butyl alcohol, employed as herein set forth, preserves the tissues so that their natural colors are stabilized and their physical shapes are retained, and that oxidation inhibiting substances are not essentially required in the preserving solution used for the treatment of said tissues, although the presence of an oxidation inhibiting substance such as thiourea is a preferred constituent thereof.

On the other hand, I have found that in preserving plant and animal tissues, the color of which is altered or destroyed by oxidation, stabilization of the natural color requires the use of oxidation inhibitors that are capable of exerting a reducing action strong enough to prevent oxidative color change in the tissues. The kinds of tissues generally requiring oxidation inhibitors of this type for maintaining their original colors unchanged are: (a) white, yellow and orange flowers, and other similarly colored plant parts; (b) leaves and other green plant parts; (c) white and yellow animal tissue; (d) organic and muscular animal tissue containing blood; and (e) certain yellow, green and blue insects, and crustaceans.

For stabilizing the natural color of the above mentioned tissues, and of other plant and animal tissues which contain oxidizable color-producing substances, I have discovered that, when used in conjunction with my preservation procedures herewith set forth, the desired results can be obtained by employing selectively a reducing agent comprising an oxygen absorbing radical such as a sulfite ($=SO_3$), a hydrosulfite ($=S_2O_4$), a nitrite ($—NO_2$), a phosphite ($=HPO_3$), or a hypophosphite ($—H_2PO_2$), associated with an alkali metal or an alkaline earth metal, including zinc and magnesium; and that these reducing type oxidation inhibitors may be used singly or with each other, or in conjunction with other antioxidant compounds such as thiourea and alkyl thiourea and/or with a compound containing an aldehyde radical; and I have furthermore found that when one or more of the above described reducing type oxidation inhibitors is used in combination with a non-reducing type inhibitor containing an (—SH) radical or a (=CS) radical, or with a compound containing an aldehyde radical (—CHO), the oxidation inhibiting effectiveness of the combination is not significantly diminished with respect to the oxidizable coloring matter in the tissues, whereas the reducing action of the combination is generally decreased with respect to the natural pigments which tend to become colorless when in the reduced state. By using such combinations, I can maintain the natural color in plant and animal tissues which contain both classes of coloring matter in association with each other, and which would tend to become partially discolored if treated with either type of oxidation inhibitor alone.

I have still further found that by using a compound containing an aldehyde radical in combination with one containing an (—SH) radical or a (=CS) radical such as thiourea and alkyl thiourea and/or with one containing an oxygen absorbing radical such as a sulfite, a hydrosulfite, a nitrite, a phosphite or a hypophosphite, substantially the same results as described in the foregoing can be obtained; and furthermore the presence of the aldehyde radical in the preserving fluid tends to increase the rigidity of the tissue so that its original shape is more readily maintained.

Suitable reducing agents that are capable of selectively producing the above described results include sodium sulfite, sodium bisulfite, sodium metabisulfite, sodium hydrosulfite, sodium nitrite, sodium phosphite, and sodium hypophosphite, and the potassium, lithium, magnesium, calcium, and zinc analogs of these salts. Suitable aldehydes include formaldehyde, acetaldehyde, propionaldehyde, butyraldehyde, valeraldehyde, hexaldehyde, heptaldehyde, octaldehyde, benzaldehyde and cinnamaldehyde; and the sulfoxylate aldehydes also known as aldehyde sulfoxylates or aldehyde hydrosulfites, such as sodium sulfoxylate formaldehyde, zinc sulfoxylate formaldehyde, sodium sulfoxylate acetaldehyde, and zinc sulfoxylate acetaldehyde. Of the foregoing substances, I prefer to use selectively, according to the nature of the tissues and the coloring matter contained in them, sodium sulfite, sodium metabisulfite, zinc hydrosulfite, calcium nitrite, potassium phosphite, magnesium hypophosphite, formaldehyde, butyraldehyde, benzaldehyde, sodium sulfoxylate formaldehyde, zinc sulfoxylate acetaldehyde, but I do not wish to be limited to these substances.

The preservation treatment is followed by dehydration to remove such free water as may have remained in the preserved material, this dehydration being carried out in a manner that provisionally maintains the stabilized color and the shape, and prepares the preserved material for impregnating and/or enveloping procedures subsequently to be carried out in Stages II and/or III.

Biological material coming within Class A, i. e., material in which the color is naturally unstable and is irreversibly altered by air-drying, is immersed while still in a fresh condition in a treating solution which consists of suitable constituents hereinafter described dissolved or dispersed in a water-dissolving volatile liquid which is practically free from detrimental effect upon the material when employed in combination with the treating agents specified. The liquids employed for this purpose may be selected from a group which includes monohydric alcohols such as the butyl and the amyl alcohols; ketones, such as acetone, diacetone and methyl-ethyl ketone; esters such as ethyl acetate, ethyl lactate, and triethyl phosphate; ethers such as dioxane and ethylene glycol monomethyl-ether; acetals such as methylal, acetal, and dioxolane; and organic amides such as formamide and dimethyl formamide; and these liquids may be used separately or in combination with each other, or with other liquids which are miscible with them but are not water-dissolving, such as turpentine and the aliphatic and the aromatic hydrocarbons. Both the treating agents and the volatile liquid vehicle in which they are incorporated are employed selectively in accordance with the individual requirements of the material, and the treating agents generally comprise:

(a) Oxidation inhibitors which are employed selectively with respect to the characteristics of the coloring matter in the material to be treated, and are chosen so as to prevent oxidative alteration in its appearance without causing bleaching or other appearance changes that might result from active reducing action exerted upon the natural color. For tissue material not generally altered in appearance by reduction, an oxidation inhibitor is used which is selected from the group of salts containing a sulfite radical such as sodium sulfite, sodium bisulfite, sodium metabisulfite, sodium hydrosulfite, sodium nitrite, sodium phosphite and sodium hypophosphite, and the potassium, lithium, magnesium, calcium, and zinc analogs of these oxygen absorbing salts; or from a group of quinones such as hydroquinone; or from a group of aldehydes such as formaldehyde, acetaldehyde, propionaldehyde, butyraldehyde, valeraldehyde, hexaldehyde, heptaldehyde, octaldehyde, benzaldehyde and cinnamaldehyde; or from a group of sulfoxylate aldehydes such as sodium sulfoxylate formaldehyde; zinc sulfoxylate formaldehyde and zinc sulfoxylate acetaldehyde; or from a group of oxidizable organic acids such as ascorbic acid; and these substances may be employed separately or in combination with each other or with generally non-reducing anti-oxidants. For material containing anthocyanin pigments or other coloring matter which is altered in appearance by reduction, an oxidation inhibitor selected from the group of generally non-reducing anti-oxidant substances containing an (—SH) radical or a (=CS) radical, such as thiourea, diethyl thiourea, diisopropyl thiourea, dibutyl thiourea, ethylene thiourea, diphenyl thiourea, phenyl thiourea and naphthal thiourea, is employed in place of a reducing type of oxidation inhibitor or in combination with it. Oxidation inhibitors are employed selectively in amounts ranging from 0.1% to 10% of the total weight of the solution, the optimum being determined in accordance with the requirements of the material undergoing preservation.

(b) The substance generally used for preservation of the tissue and stabilization of the natural color is an ionizing compound selected from the group including, but not limited to, non-oxidizing acids and the alkali metal and alkaline earth metal salts of such acids as boric, phosphoric, arsenic and the non-oxidizing carboxylic acids which are composed of carbon, oxygen and hydrogen, and especially those which have melting points higher than 35° C. The carboxylic acids in this group that I prefer to use are those which are substantially non-volatile and are not subject to alteration by the action of light and of moisture, and they include the acids commonly designated as citric, adipic, maleic, diglycolic, stearic, tartaric, azelaic, fumaric, succinic, gluconic, aconitic, sebacic, oxalic, palmitic, tricarballylic, margaric, myristic, lauric, itaconic, citraconic, mesaconic, arachidic, malic, polymethacrylic, sorbic, furoic, benzoic, hydroxybenzoic, cinnamic, hydroxycinnamic, phenylacetic, anisic, phthalic, abietic, pimaric, camphoric, naphthoic and naphthalene acetic. The acids which I may use for this purpose are not, however, limited to those enumerated above. These compounds are selectively employed singly or in combination with each other or with other similarly constituted compounds, and they are generally used in such proportions as to maintain the pH of the mixture at the value required for retention of the true natural color in the material undergoing preservation which is substantially the pH of the medium in which the coloring matter is suspended in the tissues.

The alkali metal and the alkaline earth metal salts of these acids and of other acids may be employed instead of the above mentioned acids or in combination with them for obtaining the required pH adjustment, or in the case of tissue material having pH value requirements obtainable by using a preserving solution composed of a volatile water-dissolving monohydric alcohol and thiourea the above mentioned acids and their salts may be omitted from the preserving solution. The amounts of these substances or mixtures thereof incorporated in the treating solution range from 0.5% to 10% of the total weight of the solution.

(c) Surface-active substances may be employed in the treating solution in accordance with the requirements of the material being preserved in order to maintain a suitable dispersion of such treating substances as may not be soluble in the liquid medium employed for the treating solution, and/or to obtain a more uniform and rapid response of the material to the various treating substances incorporated in the solution. The substances generally used for this purpose are preferably, but not essentially, of the non-ionizing type and are generally selected from a group of partial esters of polyhydric alcohols with long chain fatty acids, e. g., sorbitan monolaurate, and their polyoxyalkylene esters; and the amounts employed range from 0.1% to 2% of the total weight of the solution.

(d) Conditioning agents may be employed for the purpose of maintaining the opacity of the material and of modifying its rigidity or its flexibility, and of counteracting appearance changes that might otherwise be produced in it by dehydration or by extraction of soluble constituents during treatment. The substances thus used are employed selectively in accordance with the requirements of the material and include fluid organic silicon compounds; high boiling oily liquids such as dibutyl phthalate, butyl phthalyl, butyl glycolate, tributyl citrate, methyl abietate, tributyl phosphate, natural fixed oils such as cottonseed, palm, castor, teaseed, and neat's-foot oil, and drying oils such as linseed, tung, soya and dehydrated castor oil; such waxy substances as beeswax, Chinese wax, Japan wax, carnauba wax, montan wax, ceresin, spermaceti, and paraffin; plastic or resinous substances such as polyvinyl acetate and the polybutyl methacrylates, hydrogenated rosin, hydroabietyl alcohol, ester gum, glyceryl phthalate, sucrose octa-acetate, alkyl-aryl sulfonamide, aryl sulfonamide-formaldehyde resin, dimethyl hydantoin-formaldehyde resin; and natural gums and resins such as Canada balsam, shellac, mastic, sandarach, copal, elemi, dammar, rosin, and Venice turpentine. The amount of a conditioning agent employed ranges from 1% to 10% of the total weight of the solution.

(e) A limited amount of water is generally employed in the treating solution in order to increase the ionization of the water-soluble constituents, and to prevent shrinkage or other shape change in the material which might result from too rapid dehydration while undergoing preservation. The amount of water maintained in the solution for these purposes ranges from 1% to 20% of the total weight of the solution and may be regulated through the use of substances which absorb water selectively with respect to the other constituents and which have no adverse effect upon the material being preserved. For this purpose such substances as cellulose fiber and water-soluble cellulose derivatives, agar, gelatin, algin, polyvinyl alcohol, silica gel, anhydrous calcium sulphate, and calcium chloride may be employed selectively and the amount used depends upon the extent to which the water content may require regulation, generally ranging from 5% to 25% of the total weight of the dehydrating liquid.

The material while undergoing treatment is kept submerged in the treating solution for a period ranging from 1 to 24 hours, according to its permeability and the temperature at which it is maintained. During immersion, it is preferable to keep the temperature of the solution between the limits of $-5°$ to $+5°$ C., but acceptable results are obtainable at room temperature or at moderately elevated temperatures. Completion of the preserving action of the solution is generally indicated by the material assuming a more or less uniform translucent appearance as a result of being fully permeated by the solution.

When the material has become adequately preserved, it is subjected to dehydration in order to remove the water remaining in it as a result of the color-stabilizing treatment. Dehydration is carried out according to well known procedure, either by transferring the preserved material from the moisture-containing treating solution into a moisture-free water-dissolving volatile liquid, which may be the same as, or different from, the volatile vehicle employed in the treating solution, and this transfer may be made directly, or through one or several intermediate baths, each of which contains less moisture than the preceding, the final one being practically anhydrous; or by air-drying the preserved material at full atmospheric pressure or at a reduced pressure under conditions where a relative humidity lower than 20% is maintained by employment of desiccants, and/or elevated temperatures within the range tolerated by the appearance factors of the material, and generally not in excess of 75° C.; or by removal of moisture by means of low temperature condensing elements. Subsequent to dehydration, and pending impregnation and envelopment by the procedures described for Stages II and III, the material is kept in a practically moisture-free state, either in an anhydrous liquid or in an airtight and preferably desiccated container.

The several procedures for carrying out Stage I, as well as Stages II and III hereafter described, are set forth in my copending applications Serial No. 736,105 and Serial No. 69,840.

*Stage II.—Impregnation*

Biological material coming within Classes A, B, and C, which has been preserved and/or dehydrated by the procedures described in Stage I may be impregnated either with a moisture-resistant shape-reinforcing substance which protects it from deterioration and provides it with an adherent surface for securely bonding a subsequently applied coating or armor; or with a substance which is impervious to and/or unaffected by a subsequently applied enveloping medium and which prevents alteration of its natural appearance by such medium when applied; or Stage II may be omitted and no impregnation as described therefor employed.

Preserved and dehydrated material which has been prepared by the procedures in Stage I, selectively employed, is immersed in a bath of moisture-resistant shape-reinforcing substance to which a subsequently applied protective coating will adhere securely, dissolved in a suitable moisture-free volatile organic liquid vehicle such as toluene, and which is preferably, but not necessarily, maintained at an elevated temperature not in excess of 100° C.; and the material is kept submerged therein for a period of time ranging from less than 1 minute to 4 hours, dependent upon the nature of the material and the temperatures employed, until it is practically completely permeated with the impregnating substance; and this may be done at atmospheric pressure, or under increased pressure or under decreased pressure. The impregnated material is then removed from the bath, and the volatile solvent vehicle which has served as the vehicle for the impregnating substance is allowed to evaporate, preferably in freely moving air which has a relative humidity below 30%, which condition may be maintained by elevation of temperature not in excess of 100° C.; and/or by means of commonly employed desiccants.

The impregnating substance employed for this purpose consists of a suitable moisture-resistant and adhesive solid or solidifiable substance selected from a group of waxy substances such as beeswax, Chinese wax, Japan wax, carnauba wax, montan wax, ceresin, spermaceti, paraffin, and highly chlorinated hydrocarbons; or drying oils and semi-drying oils such as linseed, tung, soya, and dehydrated castor oil; or plastic and resinous substances such as vinyl acetate-chloride copolymer, polyvinyl chloride, polyvinyl acetate, polyvinyl butyral, methyl, ethyl and butyl methacrylate polymers, polyethyl acrylate, polystyrene, hydrogenated rosin, hydroabietyl alcohol, ester gum, glyceryl phthalate, sucrose octa-acetate, alkyl-aryl sulfonamide, aryl sulfonamide-formaldehyde resin, dimethyl hydantoin-formaldehyde resin, coumarone-indene polymers, polymerized terpene resins, diene polymers and natural rubber, and organic silicon fluid and resinous compounds; or natural gums and resins such as rosin, Canada balsam, shellac, mastic, sandarach, copal, elemi and dammar. Substances selected from these groups may be used separately or in combination with each other or with a plasticizer such as butyl phthalate, butyl phthalyl, butyl glycolate, or tricresyl phosphate, which may desirably modify their toughness and flexibility characteristics; and the amount of the impregnating substance dissolved in the volatile liquid vehicle generally ranges from 5% to 40% of the total weight of the solution, depending upon the substance and the solvent vehicle employed.

Material thus impregnated may be utilized for practical purposes without further processing, or it may be provided with additional protection against deterioration and enhanced in usefulness and attractiveness by being enveloped in a coating or armor, or in a case as set forth in Stage III, Procedures 1 and 2, respectively.

*Stage III.—Envelopment*

In the case of biological material in which the true natural color is to be enduringly retained, its successful envelopment in a protective medium has heretofore been restricted to Class D, that is, to material in which both color and shape are naturally stable; whereas, material which is unstable in its appearance has not heretofore been susceptible of envelopment in a manner to retain enduringly its true natural appearance characteristics.

On the other hand, by following the teaching of the present invention, it is possible to envelop material in Classes A, B, and C, having unstable appearance characteristics, in a manner that will enduringly retain its appearance characteristics, including color and shape; and this is accomplished by first color-stabilizing and dehydrating the material as described for Stage I, and selectively impregnating it as described in Stage II, and then surrounding it with a moisture-resistant substantially transparent resinous coating of any suitable thickness; or preparing the material as described in Stage I and without employment of an impregnating substance, applying said resinous coating to it. Through employment of these preparatory procedures, it is thus possible to provide the added protection of plastic envelopment to preserved biological material without altering the natural appearance of the material by so doing, and the material in the product thereby obtained, has its natural appearance enduringly retained.

Resinous substances that I have found to be utilizable for protectively enveloping preserved plant and animal tissue preserved by the procedures described for my Stages I and II are set forth in my copending applications, Serial No. 786,105, now Patent No. 2,567,929, and Serial No. 69,840, now Patent No. 2,606,843; and among these I prefer to use acrylic resins selected from the group consisting of, but not limited to, polyethyl acrylate, polymethyl methacrylate, polyethyl methacrylate, and polybutyl methacrylate; vinyl resins selected from the group consisting of, but not limited to, polyvinyl chloride, polyvinylidine chloride, vinyl acetate-chloride copolymers, polyvinyl acetate and polyvinyl butyral; styrene resins selected from the group consisting of, but not limited to, polystyrene and alkyd-styrene compositions including styrene-polyester copolymers; organic silicon resinous compounds; coumarone-indene polymers; terpene polymers; hydrogenated rosin; butadiene polymers; natural rubber; natural resins including but not limited to rosin, shellac, dammar, copal, mastic, and sandarach. I have further discovered that preserved biological specimens and other objects can be enveloped in a substantially transparent, moisture-resistant resinous covering, which protects them from external injury and at the same time aids in maintaining their original color and shape, by surrounding the object with monomeric methyl methacrylate and/or monomeric ethyl methacrylate, to which has been added and dispersed therein an aryl sulfonamide-formaldehyde resin and a monomeric styrene-polyester composition, and then adding to said resinous mixture a peroxide catalyst such as methyl-ethyl ketone peroxide, the amount employed being from 0.2% to 1.0% of the total weight of the mixture, and then while the object is completely surrounded by said mixture subjecting it to a temperature of from 40° C. to 65° C. until it has polymerized to a solid state. The amounts of the components of the mixture which I have found suitable for producing the desired substantially transparent, moisture-resistant resinous coating are from 10 to 80 parts of monomeric alkyl methacrylate, from 10 to 70 parts of aryl sulfonamide-formaldehyde resin, and from 10 to 80 parts of monomeric styrene-polyester composition; the substances and proportions that I prefer to use being 40 parts of monomeric ethyl methacrylate, 30 parts of aryl sulfonamide-formaldehyde resin supplied under the trade name Santolite MHP, and 30 parts of monomeric styrene-polyester composition supplied under the trade name Selectron 5026; and the amount of methyl-ethyl ketone peroxide added to this mixture to catalyze polymerization is 0.5% of the total weight of the mixture. I may, however, use any proportions of the several components within the limits specified above, and I may employ substances included in the above described classes other than those here specifically designated, and furthermore, I may employ in combination with each other and in any proportions above specified substances selected from any two of the three classes described. The advantages of substantially transparent moisture-resistant resinous coating resulting from polymerization of the above mixture are: (a) substantially greater abrasion resistance than that of polymerized ethyl methacrylate, (b) a substantially lower degree of discoloration from exposure to sunlight than in polymerized styrene-polyester resins, and (c) a substantially higher temperature at which softening occurs than in aryl sulfonamide-formaldehyde resins. I do not limit myself to the above enumerated substances for the protective envelopment of preserved biological tissues; and furthermore, I may selectively employ these substances singly or in combination with each other or with other compatible substances. I may also use a closed, moisture-resistant, substantially transparent, hollow resinous plastic box to envelop preserved biological material.

The following are representative examples of treating biological material in accordance with the procedures set forth herein:

EXAMPLE I

A white gardenia flower (horticultural variety) being in a fresh turgid state was immersed for 24 hours in a solution consisting of 1000 grams of tertiary butyl alcohol, 50 grams of sodium metabisulfite, and 20 grams of water, during which time the room temperature ranged between 20° C. and 25° C.

At the end of this time the specimen was removed and was allowed to dry free of volatile constituents in air having a relative humidity lower than 30% and a temperature within the above mentioned range. It was examined after 24 hours and found to be free of volatile matter and to have retained its original appearance in respect to both color and shape.

It was then dipped into a resinous solution consisting of 10 parts of ethyl methacrylate polymer and 10 parts of vinyl acetate-chloride copolymer dissolved in 40 parts of acetone and 40 parts of toluene. Upon removal the volatile constituents were allowed to evaporate for 4 hours in air having a relative humidity lower than 30% and a temperature within the above mentioned range. It was subsequently dipped and dried alternately in the same manner until a total of five coatings had been applied.

It was finally allowed to remain for 48 hours in air having a relative humidity below 30% and a temperature within the above range. At the end of this period it was found to have retained its original appearance substantially unchanged as to color and shape. Subsequent exposure to air having a relative humidity of 90% and a temperature of 30° C. cause no detectable alteration in the appearance of the above specimen which had been preserved and coated in the manner described.

EXAMPLE II

The fresh turgid white fruits attached to the red stalk of white baneberry, Actaea alba (L.) Mill., were immersed for 24 hours in a solution consisting of 800 grams of tertiary butyl alcohol, 200 grams of normal butyl alcohol, 100 grams of thiourea, 50 grams of citric acid, 50 grams of octaldehyde, and 20 grams of water, during which time the temperature was maintained at 10° C.

At the end of this time the specimen was removed and dried for 24 hours in air having a relative humidity lower than 30% and a temperature ranging between 20° C. and 25° C. Upon examination it was found to have retained its original appearance substantially unchanged as to color and shape.

It was then dipped in the resinous solution described in Example I, and alternate dipping and drying as described therein was continued until a total of five resinous coatings had been applied; and finally the residual volatile constituents were removed by allowing the specimen to remain for 24 hours in air having a relative humidity lower than 30% and a temperature maintained at 40° C.

Subsequent exposure to air having a relative humidity of 90% and a temperature of 30° C. caused no detectable alteration in the appearance of the specimen which had been thus preserved and coated.

EXAMPLE III

A fresh turgid stalk of lily-of-the-valley, Convallaria majalis L., bearing white flowers was immersed in a solution consisting of 1000 grams of tertiary butyl alcohol, 100 grams of thiourea, 50 grams of sodium sulfoxylate formaldehyde and 20 grams of water, and allowed to remain therein for 15 hours at a temperature ranging between 20° C. and 25° C.

At the end of this time it was removed and dried free of volatile constituents in the manner employed in Example I, and it was then found to have retained its original appearance substantially unchanged as to color and shape.

The preserved specimen, being in a substantially moisture-free condition, was then placed in a rectangular glass dish containing a ½-inch layer of partially polymerized and gelled styrene-polyester resinous composition, commercially supplied as "Selectron-5026," to which had been added 0.3% of methyl-ethyl ketone peroxide to serve as a polymerization catalyst. The resinous composition was allowed to polymerize further until it became a firm gel capable of anchoring the specimen in position, and an additional amount of similarly catalyzed resinous composition in a fluid state was then applied and enveloped the specimen with a coating substantially ½-inch thick. After applying to the dish a metal foil closure to prevent escape of styrene vapor, the dish and its contents were allowed to remain at a temperature ranging between 22° C. and 26° C. for 15 hours, during which time the styrene-polyester resinous composition surrounding the specimen became a firm gell throughout. It was then placed in a thermostatically controlled oven in which a temperature of 45° C. was maintained. After 4 days it was taken out and allowed to cool down to room temperature, and the enveloped specimen was then removed from the glass dish. The preserved and enveloped specimen was found to have retained its original appearance substantially unchanged as to color and shape, and these characteristics remained unaltered after immersion for 10 days in water.

EXAMPLE IV

A fresh green leaf of ivy, Hedera helix was immersed for 24 hours in a solution consisting of 1000 grams of tertiary butyl alcohol, 100 grams of thiourea, 50 grams of sodium sulfite, and 50 grams of formalin (40% formaldehyde by volume), during which time the room temperature ranged between 20° C. and 25° C.

At the end of this time the specimen was removed, and the volatile constituents were allowed to evaporate as described in Example I. The leaf was observed to be substantially unchanged in color and shape, and was coated by dipping in a resinous solution of the same composition as that employed in Example I and by the same procedure as therein described.

The leaf preserved and coated as set forth in the foregoing was found to have retained its original appearance as to color and shape after all volatile matter had been evaporated.

EXAMPLE V

Freshly killed chicken tissue comprising gross sections of fatty muscle, gizzard, lung and windpipe were immersed for 24 hours at room temperature in a solution of 1000 grams of tertiary butyl alcohol, 100 grams of dibutyl thiourea, 50 grams of sodium sulfite, and 50 grams of water.

At the end of the period the specimens were removed and the volatile ingredients were allowed to evaporate in air having a relative humidity lower than 30% and at a temperature ranging between 20° C. and 25° C. The specimen material was then found to have retained its original appearance substantially unchanged with respect to color and shape.

It was then enveloped in a styrene-polyester resin of the same composition as that employed in Example III and by the same procedure as therein set forth.

The specimen material thus preserved and enveloped was found to have retained its original appearance and was not altered by subsequent immersion in water or by exposure to humid air at temperatures up to 35° C.

I claim:

1. A process for preserving naturally colored plant and animal tissues, comprising, immersing the tissues in a color stabilizing and preserving solution containing essentially a volatile water-dissolving monohydric alcohol, thiourea and sodium sulfite, said solution being adjusted to a pH corresponding substantially to the pH of the liquid medium of the tissues in which the natural coloring matter is suspended, removing the tissues from the solution and permitting the volatile constituents retained in them to evaporate, whereby the natural colors of the tissues are stabilized and their physical shapes are retained, and then applying to said tissues a substantially transparent moisture-resistant resinous coating.

2. A process for preserving naturally colored plant and animal tissues, comprising, immersing the tissues in a color stabilizing and preserving solution containing essentially a volatile water-dissolving monohydric alcohol, thiourea and sodium metabisulfite, said solution being adjusted to a pH corresponding substantially to the pH of the liquid medium of the tissues in which the natural coloring matter is suspended, removing the tissues from the solution and permitting the volatile constituents retained in them to evaporate, whereby the natural colors of the tissues are stabilized and their physical shapes are retained, and then applying to said tissues a substantially transparent moisture-resistant resinous coating.

3. A process for preserving naturally colored plant and animal tissues, comprising, immersing the tissues in a color stabilizing and preserving solution containing essentially a volatile water-dissolving monohydric alcohol, thiourea and sodium nitrite, said solution being adjusted to a pH corresponding substantially to the pH of the liquid medium of the tissues in which the natural coloring matter is suspended, removing the tissues from the solution and permitting the volatile constituents retained in them to evaporate, whereby the natural colors of the tissues are stabilized and their physical shapes are retained, and then applying to said tissues a substantially transparent moisture-resistant resinous coating.

4. A process for preserving naturally colored plant and animal tissues, comprising, immersing the tissues in a color stabilizing and preserving solution containing essentially a volatile water-dissolving monohydric alcohol, thiourea and sodium hydrosulfite, said solution being adjusted to a pH corresponding substantially to the pH of the liquid medium of the tissues in which the natural coloring matter is suspended, removing the tissues from the solution and permitting the volatile constituents retained in them to evaporate, whereby the natural colors of the tissues are stabilized and their physical shapes are retained, and then applying to said tissues a substantially transparent moisture-resistant resinous coating.

5. A process for preserving naturally colored plant and animal tissues, comprising, immersing the tissues in a color stabilizing and preserving solution containing essentially a volatile water-dissolving monohydric alcohol, thiourea and potassium hypophosphite, said solution being adjusted to a pH corresponding substantially to the pH of the liquid medium of the tissues in which the natural coloring matter is suspended, removing the tissues from the solution and permitting the volatile constituents retained in them to evaporate, whereby the natural colors of the tissues are stabilized and their physical shapes are retained, and then applying to said tissues a substantially transparent moisture-resistant resinous coating.

6. A process for preserving naturally colored plant and animal tissues, comprising, immersing the tissues in a color stabilizing and preserving solution containing essentially a volatile water-dissolving monohydric alcohol, thiourea and an oxygen absorbing reducing agent selected from the group consisting of alkali metal and alkaline earth metal sulfites, hydrosulfites, nitrites, phosphites and hypophosphites, said solution being adjusted to a pH corresponding substantially to the pH of the liquid medium of the tissues in which the natural coloring matter is suspended, removing the tissues from the solution and permitting the volatile constituents retained in them to evaporate, whereby the natural colors of the tissues are stabilized and their physical shapes are retained, and then applying to said tissues a substantially transparent moisture-resistant resinous coating.

7. A process for preserving naturally colored plant and animal tissues, comprising, immersing the tissues in a color stabilizing and preserving solution containing essentially a volatile water-dissolving monohydric alcohol, an aldehyde selected from the group consisting of formaldehyde, acetaldehyde, propionaldehyde, butyraldehyde, valeraldehyde, hexaldehyde, heptaldehyde, octaldehyde, benzaldehyde, and cinnamaldehyde, and an oxygen absorbing reducing agent selected from the group consisting of alkali metal and alkaline earth metal sulfites, hydrosulfites, nitrites, phosphites and hypophosphites, said solution being adjusted to a pH corresponding substantially to the pH of the liquid medium of the tissues in which the natural coloring matter is suspended, removing the tissues from the solution and permitting the volatile constituents retained in them to evaporate, whereby the natural colors of the tissues are stabilized and their physical shapes are retained, and then applying to said tissues a substantially transparent moisture-resistant resinous coating.

8. A process for preserving naturally colored plant and animal tissues, comprising, immersing the tissues in a color stabilizing and preserving solution containing essentially a volatile water-dissolving monohydric alcohol and sodium sulfoxylate formaldehyde, said solution being adjusted to a pH corresponding substantially to the pH of the liquid medium of the tissues in which the natural coloring matter is suspended, removing the tissues from the solution and permitting the volatile constituents retained in them to evaporate, whereby the natural colors of the tissues are stabilized and their physical shapes are retained, and then applying to said tissues a substantially transparent moisture-resistant resinous coating.

9. A process for preserving naturally colored plant and animal tissues, comprising, immersing the tissues in a color stabilizing and preserving solution containing essentially a volatile water-dissolving monohydric alcohol and zinc sulfoxylate formaldehyde, said solution being adjusted to a pH corresponding substantially to the pH of the liquid medium of the tissues in which the natural coloring matter is suspended, removing the tissues from the solution and permitting the volatile constituents retained in them to evaporate, whereby the natural colors of the tissues are stabilized and their physical shapes are retained, and then applying to said tissues a substantially transparent moisture-resistant resinous coating.

10. A process for preserving naturally colored plant and animal tissues, comprising, immersing the tissues in a color stabilizing and preserving solution containing essentially a volatile water-dissolving monohydric alcohol and sodium sulfoxylate acetaldehyde, said solution being adjusted to a pH corresponding substantially to the pH of the liquid medium of the tissues in which the natural coloring matter is suspended, removing the tissues from the solution and permitting the volatile constituents retained in them to evaporate, whereby the natural colors of the tissues are stabilized and their physical shapes are retained, and then applying to said tissues a substantially transparent moisture-resistant resinous coating.

11. A process for preserving naturally colored plant and animal tissues, comprising, immersing the tissues in a color stabilizing and preserving solution containing essentially a volatile water-dissolving monohydric alcohol and zinc sulfoxylate acetaldehyde, said solution being adjusted to a pH corresponding substantially to the pH of the liquid medium of the tissues in which the natural coloring matter is suspended, removing the tissues from the solution and permitting the volatile constituents retained in them to evaporate, whereby the natural colors of the tissues are stabilized and their physical shapes are retained, and then applying to said tissues a substantially transparent moisture-resistant resinous coating.

GEORGE R. FESSENDEN.

References Cited in the file of this patent

UNITED STATES PATENTS

| Number | Name | Date |
|---|---|---|
| 547,227 | Pfitzer | Oct. 1, 1895 |
| 1,554,641 | Miner | Sept. 22, 1925 |
| 1,588,164 | Brunner et al. | June 8, 1926 |
| 2,105,688 | Fessenden | Jan. 18, 1938 |
| 2,300,495 | Gerhart | Nov. 3, 1942 |

FOREIGN PATENTS

| Number | Country | Date |
|---|---|---|
| 274,314 | Great Britain | July 21, 1927 |